United States Patent
Suzuki (10) Patent No.: US 11,067,321 B2
(45) Date of Patent: Jul. 20, 2021

(54) AIR-CONDITIONING SYSTEM AND REFRIGERANT-AMOUNT SETTING METHOD FOR THE SAME

(71) Applicant: Mitsubishi Electric Corporation, Tokyo (JP)

(72) Inventor: Yasuhiro Suzuki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 16/484,545

(22) PCT Filed: May 9, 2017

(86) PCT No.: PCT/JP2017/017516
§ 371 (c)(1),
(2) Date: Aug. 8, 2019

(87) PCT Pub. No.: WO2018/207251
PCT Pub. Date: Nov. 15, 2018

(65) Prior Publication Data
US 2020/0056820 A1    Feb. 20, 2020

(51) Int. Cl.
*F25B 49/02* (2006.01)
*F25B 49/00* (2006.01)

(52) U.S. Cl.
CPC ........ *F25B 49/005* (2013.01); *F25B 2700/04* (2013.01)

(58) Field of Classification Search
CPC ... F24F 11/36; F25B 49/005; F25B 2500/222; F25B 2600/05; F25B 2700/04
See application file for complete search history.

(56) References Cited

U.S. PATENT DOCUMENTS

2002/0178738 A1    12/2002    Taira et al.
2005/0155365 A1    7/2005    Shah et al.
(Continued)

FOREIGN PATENT DOCUMENTS

JP    H06-088638 A    3/1994
JP    2000-234827 A    8/2000
(Continued)

OTHER PUBLICATIONS

Extended European Search Report dated Apr. 20, 2020 issued in corresponding EP application No. 17909643.3.
(Continued)

*Primary Examiner* — Jonathan Bradford
(74) *Attorney, Agent, or Firm* — Posz Law Group, PLC (57) ABSTRACT

An air-conditioning system includes a refrigerant circuit that circulates refrigerant, a heat exchange unit that houses a load-side heat exchanger provided in the refrigerant circuit and is connected with a plurality of air-conditioned spaces by a plurality of air supply passages for use in the supply of air that passes through the load-side heat exchanger, a refrigerant detection device that detects leakage of the refrigerant and a plurality of opening/closing devices that are each provided in an associated one of the plurality of air supply passages and opened/closed independently of each other. When the refrigerant detection device detects leakage of the refrigerant, the plurality of opening/closing devices are all opened.

14 Claims, 7 Drawing Sheets

(56) References Cited

U.S. PATENT DOCUMENTS

| | | | |
|---|---|---|---|
| 2010/0082162 A1* | 4/2010 | Mundy | F24F 11/70 700/277 |
| 2013/0074690 A1* | 3/2013 | Tomimatsu | B03C 3/155 95/26 |
| 2016/0178229 A1* | 6/2016 | Chen | F24F 11/70 62/56 |
| 2016/0327287 A1* | 11/2016 | Sprayberry | F24D 5/04 |
| 2018/0073762 A1 | 3/2018 | Yajima et al. | |
| 2020/0056802 A1 | 2/2020 | Suzuki et al. | |

FOREIGN PATENT DOCUMENTS

| | | |
|---|---|---|
| JP | 4599699 B2 | 12/2010 |
| JP | 2016-196996 A | 11/2016 |
| WO | 2016079801 A1 | 5/2016 |

OTHER PUBLICATIONS

Australian Office Action dated Jun. 4, 2020 issued in corresponding Australian application No. 2017413868.
International Search Report of the International Searching Authority dated Aug. 8, 2017 for the corresponding international application No. PCT/JP2017/017516 (and English translation).
Office Action dated Oct. 29, 2020 issued in corresponding CN patent application No. 201780090313.2 (and English translation).
Office Action dated Mar. 25, 2021 issued in corresponding CN patent application No. 201780090313.2 (and English translation).

\* cited by examiner

AIR-CONDITIONING SYSTEM AND REFRIGERANT-AMOUNT SETTING METHOD FOR THE SAME

CROSS REFERENCE TO RELATED APPLICATION

This application is a U.S. national stage application of PCT/JP2017/017516 filed on May 9, 2017, the contents of which are incorporated herein by reference.

TECHNICAL FIELD

The present invention relates to an air-conditioning system provided with a heat exchange unit connected with a plurality of target spaces for air-conditioning, by a plurality of air supply passages, and a refrigerant-amount setting method for the air-conditioning system.

BACKGROUND ART

Patent Literature 1 describes an air-conditioning apparatus that is provided with a refrigerant detection device provided at an outer surface of an indoor unit and a control unit that performs control for causing an indoor fan to rotate when the refrigerant detection device detects refrigerant. In the air-conditioning apparatus, when refrigerant leaks into a room from an extension pipe connected to the indoor unit or refrigerant leaking within the indoor unit flows out of the indoor unit through a gap in a housing of the indoor unit, the refrigerant detection device can detect the leakage refrigerant. Furthermore, when detecting leakage of the refrigerant, the refrigerant detection device causes the indoor fan to rotate, whereby air in the room is sucked from an air inlet provided in the housing of the indoor unit, air therein is blown from the air outlet into the room, and the leakage refrigerant can thus be diffused.

CITATION LIST

Patent Literature

Patent Literature 1: Japanese Patent Publication No. 4599699

SUMMARY OF INVENTION

Technical Problem

For example, in an air-conditioning system that air-conditions a plurality of target spaces for air-conditioning, using a single refrigerant circuit, the amount of refrigerant may be large for the volume of each of the target spaces. In such an air-conditioning system, if refrigerant leaks, and then even if the refrigerant is uniformly diffused in any one of the target spaces, the refrigerant concentration of the target space may increase.

The present invention has been made to solve the above problem, and an object of the invention is to provide an air-conditioning system and a refrigerant-amount setting method for the air-conditioning system, which can prevent an increase in the refrigerant concentration of a target space for air-conditioning, even if refrigerant leakage occurs.

Solution to Problem

An air-conditioning system of one embodiment of the present invention includes a refrigerant circuit that circulates refrigerant, a heat exchange unit that houses a load-side heat exchanger provided in the refrigerant circuit and is connected with a plurality of target spaces for air-conditioning by a plurality of air supply passages for use in supply of air that passes through the load-side heat exchanger, a refrigerant detection device that detects leakage of the refrigerant, and a plurality of opening/closing devices that are each provided in the plurality of air supply passages and opened/closed independently of each other. When the refrigerant detection device detects leakage of the refrigerant, the plurality of opening/closing devices are all opened.

A refrigerant-amount setting method for the air-conditioning system, according to another embodiment of the present invention, is a method for setting an amount of refrigerant in the air-conditioning system according to the above embodiment of the present invention. In the refrigerant-amount setting method, the amount of refrigerant enclosed in the refrigerant circuit satisfies M<LFL×V, where M [kg] is the amount of refrigerant enclosed in the refrigerant circuit, LFL [kg/m$^3$] is a lower flammability limit that is the minimum concentration of the refrigerant for combustion, and V [m$^3$] is the total volume of one or more of the target spaces that are connected with the heat exchange unit by one or more of the opening/closing devices that are opened when the refrigerant detection device detects leakage of the refrigerant.

Advantageous Effects of Invention

According to the embodiments of the present invention, if refrigerant leakage occurs, it is possible to diffuse leakage refrigerant into target spaces for air-conditioning via opening/closing devices being in the opened state, and thereby prevent an increase in the refrigerant concentration of the target spaces.

DESCRIPTION OF EMBODIMENTS

Embodiment 1

Figure 1:
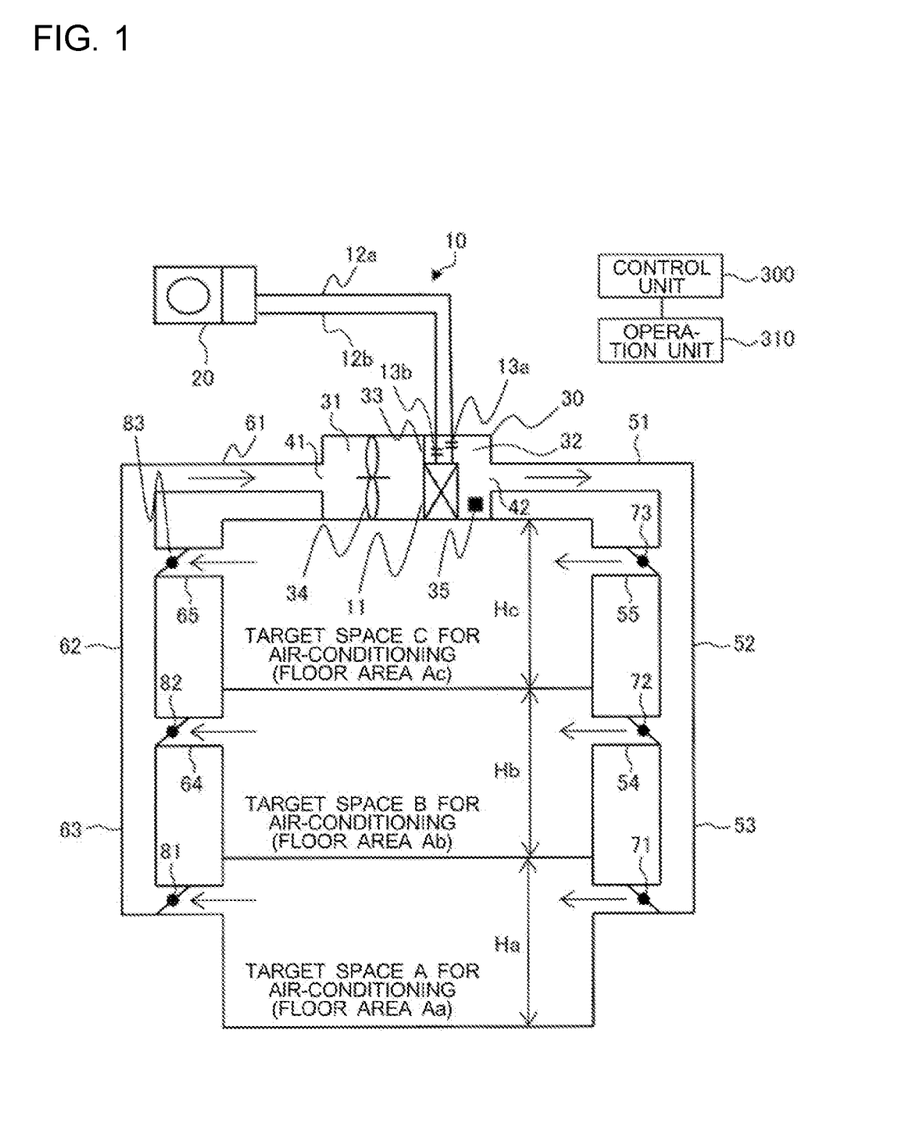
FIG. 1 illustrates a schematic configuration of an air-conditioning system according to embodiment 1 of the present invention.

An air-conditioning system and a refrigerant-amount setting method for the air-conditioning system, according to embodiment 1 of the present invention, will be described. FIG. 1 illustrates a schematic configuration of the air-conditioning system according to embodiment 1. The air-conditioning system according to embodiment 1 is, for example, an indoor-air processing type air-conditioning system that processes indoor loads of three target spaces A, B and C for air-conditioning. The target spaces A, B and C are a plurality of rooms partitioned off as separate rooms. The target space A has a floor area Aa and a height Ha from a floor surface to a ceiling. The target space B has a floor area Ab and a height Hb from a floor surface to a ceiling. The target space C has a floor area Ac and has a height Hc from a floor surface to a ceiling.

As illustrated in FIG. 1, the air-conditioning system according to embodiment 1 includes a refrigerant circuit 10 that circulates refrigerant. In the refrigerant circuit 10, a compressor, a refrigerant flow-passage switching device (for example, a four-way valve), a heat-source-side heat exchanger, a pressure-reducing device and a load-side heat exchanger 11 are connected by refrigerant pipes.

As refrigerant enclosed in the refrigerant circuit 10, slightly flammable refrigerant such as R1234yf and R1234ze (E) or highly flammable refrigerant such as R290 or R1270 is used. Such refrigerant may be used as a single-component refrigerant or as a mixed refrigerant in which two or more refrigerants are mixed. Hereinafter, refrigerant having flammability higher than or equivalent to a slightly flammable level (for example, 2L or higher in ASHRAE34 classification) may be referred to as "flammable refrigerant." Furthermore, as the refrigerant enclosed in the refrigerant circuit 10, nonflammable refrigerant having nonflammability (for example, 1 in ASHRAE34 classification) such as R22 or R410A can also be used. These types of refrigerant has a higher density than air under atmospheric pressure (for example, the temperature is room temperature (25 degrees C.).

Furthermore, the air-conditioning system includes a heat source unit 20 that houses at least a heat-source-side heat exchanger provided in the refrigerant circuit 10 and a load unit 30 (an example of a heat exchange unit) that houses at least a load-side heat exchanger 11 provided in the refrigerant circuit 10. The heat source unit 20 and the load unit 30 are connected by two extension pipes 12a and 12b, which are parts of the refrigerant pipes of the refrigerant circuit 10. The extension pipe 12a is connected to the load-side heat exchanger 11 via a joint portion 13a, and the extension pipe 12b is connected to the load-side heat exchanger 11 via a joint portion 13b. In embodiment 1, the heat source unit 20 houses not only the heat-source-side heat exchanger, but the compressor, the refrigerant flow-passage switching device and the pressure-reducing device in the refrigerant circuit 10. The refrigerant circuit 10, the heat source unit 20 and the load unit 30 are controlled by a control unit 300, which will be described later.

In the housing of the load unit 30, an air inlet 41 and an air outlet 42 are provided. The air inlet 41 allows air to flow into the load unit 30, and the air outlet 42 allows air to flow out of the load unit 30. The space in the housing of the load unit 30 is partitioned into a fan chamber 31 and a heat exchanger chamber 32 by a partition plate 33. An opening port is provided in the partition plate 33 as an air flow passage between the fan chamber 31 and the heat exchanger chamber 32. The fan chamber 31 houses an fan 34. The heat exchange chamber 32 houses the load-side heat exchanger 11, the joint portions 13a and 13b, and a refrigerant detection device 35.

The refrigerant detection device 35 detects leakage of refrigerant. As the refrigerant detection device 35, for example, a semiconductor gas sensor can be used. This, however, is not limitative. The refrigerant detection device 35 detects the concentration of refrigerant in air and outputs a detection signal to the control unit 300, which will be described later. The refrigerant detection device 35 is provided in the heat exchanger chamber 32. This, however, is not limitative. That is, the refrigerant detection device 35 may be provided in the fan chamber 31 or may be provided outside the load unit 30, for example, in an air supply duct, which will be described later. With respect to the location of the refrigerant detection device 35, it suffices that the refrigerant detection device 35 is provided in the load unit 30 or in an air supply passage from the load unit 30 to the target space A, B or C.

In the load unit 30, refrigerant may leak from brazed part of the load-side heat exchanger 11 and the joint portions 13a and 13b. It is therefore preferable that the load-side heat exchanger 11 and the joint portions 13a and 13b be provided in the housing of the load unit 30 (for example, in the heat exchanger chamber 32) or in the air supply duct.

The control unit 300 includes a microcomputer provided with a CPU, a ROM, a RAM, an I/O port, a timer, etc. The control unit 300 is capable of mutually communicate with an operation unit 310. The operation unit 310 allows a user to operate the operation unit 310, and outputs an operation signal to the control unit 300 in response to the operation by the user. The operation unit 310 includes a plurality of remote control units each provided in an associated one of the target spaces A, B and C and a centralized controller of a higher rank than those of the plurality of remote control units.

The control unit 300 controls the operation of the entire air-conditioning system including the refrigerant circuit 10, the heat source unit 20, the load unit 30, dampers 71, 72, 73, 81, 82 and 83, etc., which will be described later, based on an operation signal from the operation unit 310 and detection signals from sensors or the like. The control unit 300 may be provided in the housing of the heat source unit 20 or in the housing of the load unit 30. The control unit 300 may also include a heat-source-side control unit provided in the heat source unit 20 and a load-side control unit provided in the load unit 30 and capable of communicating with the heat-source-side control unit.

The load-side heat exchanger 11, the fan 34, the refrigerant detection device 35 and the control unit 300 may also be provided in the load unit 30 or may be assembled separately from the load unit 30 when being installed at the actual place.

When the fan 34 operates, air flows from the air inlet 41 toward the air outlet 42 in the housing of the load unit 30. The air sucked from the air inlet 41 into the fan chamber 31 passes through the opening port of the partition plate 33 and the load-side heat exchanger 11 of the heat exchanger chamber 32 in this order. The air that passes through the load-side heat exchanger 11 is cooled or heated through heat exchange with the refrigerant, and blown out from the air outlet 42 as conditioned air.

The air outlet 42 of the load unit 30 is connected in parallel to the target spaces A, B and C by a plurality of air supply passages. The air supply passage between the air outlet 42 and the target space A is made up of air supply ducts 51, 52 and 53. The air supply passage between the air outlet 42 and the target space B is defined by the air supply ducts 51, 52 and 54. The air supply passage between the air outlet 42 and the target space C is defined by the air supply ducts 51 and 55. In the case where refrigerant having a higher density than air is used, it is preferable that the air supply ducts 53, 54 and 55 be provided at upper positions in the target spaces A, B and C (for example, positions close to the ceiling). When refrigerant having a smaller density than air is used, it is preferable that the air supply ducts 53, 54 and 55 be provided at lower positions in the target spaces A, B and C (for example, positions close to the floor).

The air inlet 41 of the load unit 30 is connected in parallel with the target spaces A, B and C by a plurality of return passages. A return passage between the target space A and the air inlet 41 is defined by return ducts 63, 62 and 61. A return passage between the target space B and the air inlet 41 is defined by return ducts 64, 62 and 61. A return passage between the target space C and the air inlet 41 is defined by return ducts 65 and 61.

The air-conditioning system includes a plurality of dampers 71, 72 and 73 (examples of opening/closing devices). The damper 71 is provided at the air supply duct 53 and configured to open/close the air supply passage between the air outlet 42 and the target space A. The damper 72 is provided in the air supply duct 54 and configured to open/close the air supply passage between the air outlet 42 and the target space B. The damper 73 is provided in the air supply duct 55 and configured to open/close the air supply passage between the air outlet 42 and the target space C. The dampers 71, 72 and 73 are opened/closed independently of each other under the control by the control unit 300. For example, the damper 71 is opened/closed based on an operation of one of the remote control units in the concentrated controller, which is provided the target space A, the damper 72 is opened/closed based on an operation of one of the remote control units in the concentrated controller, which is provided in the target space B, and the damper 73 is opened/closed based on operation by one of the remote control units in the concentrated controller, which is provided in the target space C. The air-conditioning system according to embodiment 1 operates as a so-called individual operation type variable air-conditioning system in which it is possible to determine whether or not to supply conditioned air to each of the conditioned spaces A, B and C. The dampers 71, 72 and 73 may also be provided at the air outlet 42 of the load unit 30.

Furthermore, the air-conditioning system also includes a plurality of dampers 81, 82 and 83. The damper 81 is provided in the return duct 63 and configured to open/close the return passage between the target space A and the air inlet 41. The damper 82 is provided in the return duct 64 and configured to open/close the return passage between the target space B and the air inlet 41. The damper 83 is provided in the return duct 65 and configured to open/close the return passage between air-conditioned space C and the air inlet 41. The damper 81 is opened/closed in conjunction with the damper 71 under the control by the control unit 300. The damper 82 is opened/closed in interlock with the damper 72 under the control by the control unit 300. The damper 83 is opened/closed in interlock with the damper 73 under the control by the control unit 300. The dampers 81, 82 and 83 may also be provided in the air inlet 41 of the load unit 30.

The refrigerant detection device 35, the operation unit 310 and the dampers 71, 72, 73, 81, 82 and 83 are connected to the control unit 300 by control lines such that the refrigerant detection device 35, the operation unit 310 and the dampers 71, 72, 73, 81, 82 and 83 can communicate with the control unit 300. Thereby, the refrigerant detection device 35, the operation unit 310 and the dampers 71, 72, 73, 81, 82 and 83 can share information on states of the air-conditioning system with the heat source unit 20 and the load unit 30. Furthermore, the control unit 300 can acquire information from the refrigerant detection device 35, the operation unit 310, the dampers 71, 72, 73, 81, 82 and 83, etc., and control operations of the refrigerant detection device 35, the operation unit 310, the dampers 71, 72, 73, 81, 82 and 83, etc.

The control unit 300 can confirm that the refrigerant detection device 35 and the dampers 71, 72, 73, 81, 82 and 83 are connected, through communication via the control lines. The control unit 300 does not allow the air-conditioning system (for example, the refrigerant circuit 10) to operate, unless the control unit 300 can confirm that the control unit 300 are connected to the refrigerant detection device 35 and at least the dampers 71, 72 and 73 at the air supply passage such that the control unit 300 can communicate with the refrigerant detection device 35 and at least the dampers 71, 72 and 73.

Figure 2:
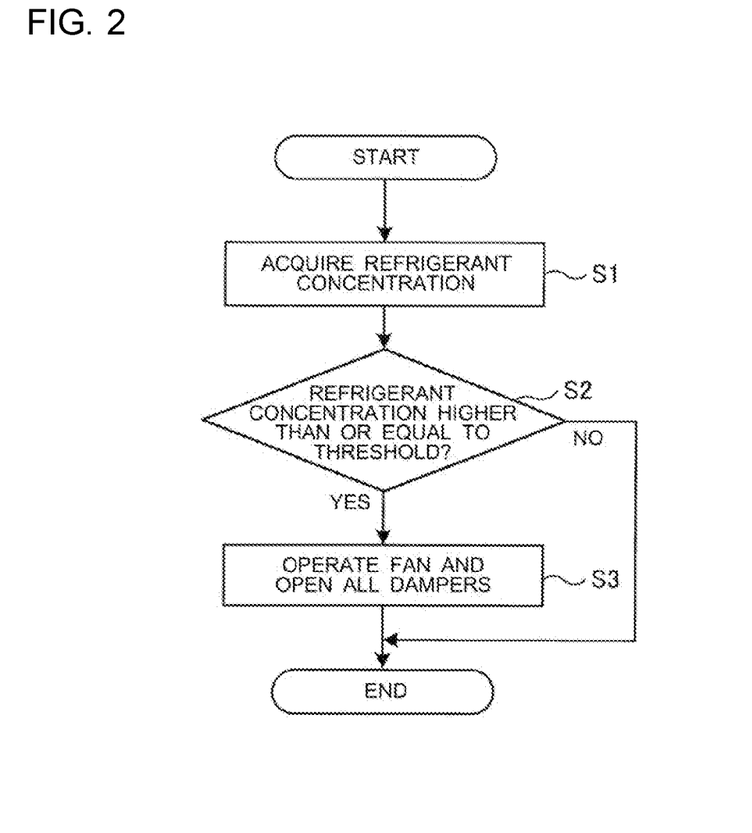
FIG. 2 is a flowchart illustrating an example of a refrigerant leakage detection process that is executed by a control unit 300 of the air-conditioning system according to embodiment 1 of the present invention.

FIG. 2 is a flowchart of an example of a refrigerant leakage detection process that is executed by the control unit 300 of the air-conditioning system according to embodiment 1. The refrigerant leakage detection process is repeatedly executed at predetermined time intervals only during the operation of the air-conditioning system or at all times regardless whether the air-conditioning system is in operation or in the stopped state, as long as power is supplied to the air-conditioning system. In the case where power is supplied from a power source to the air-conditioning system via a power supply switch, preferably, the power supply switch should be kept on at all times.

In step S1 in FIG. 2, the control unit 300 acquires information on the concentration of refrigerant in the vicinity of the refrigerant detection device 35 based on a detection signal from the refrigerant detection device 35.

Next, in step S2, the control unit 300 determines whether or not the concentration of refrigerant in the vicinity of the refrigerant detection device 35 is higher than or equal to a predetermined threshold. When the control unit 300 determines that the concentration of refrigerant is higher than or equal to the threshold, the process proceeds to step S3, and when the control unit 300 determines that the concentration of refrigerant is less than the threshold, the process ends.

In step S3, the control unit 300 causes the fan 34 to operate. That is, when the fan 34 is operated, the control unit 300 keeps the fan 34 operated, and when the fan 34 is in the stopped, the control unit 300 causes the fan 34 to start to operate. It is preferable that an operation rotation speed of the fan 34 (that is, the amount of air from the fan 34) be set to the maximum. Furthermore, in step S3, the control unit 300 causes all the dampers 71, 72 and 73 provided at least at the air supply passage to open. That is, the control unit 300 causes a closed one or ones of the dampers 71, 72 and 73 to be opened, and keeps an opened or opened ones of the dampers 71, 72 and 73 opened. Therefore, the dampers 71, 72 and 73 provided at the air supply passage are all opened. As a result, the dampers 81, 82 and 83 provided at the return passage are also all opened in interlock with the dampers 71, 72 and 73. In step S3, the control unit 300 may notify the user of the leakage of refrigerant using a display unit or a speech output unit provided in the operation unit 310.

As described above, in the refrigerant leakage detection process, when refrigerant leakage is detected (that is, when the concentration of refrigerant detected by the refrigerant detection device 35 is higher than or equal to the threshold), the operation of the fan 34 is started and the dampers 71, 72, 73, 81, 82 and 83 are all opened. Thereby, refrigerant leaking in the load unit 30, along with air blown by the fan 34, is blown into all the target spaces A, B and C via the air supply passages. Therefore, even when refrigerant leaks while conditioned air is being supplied to only one or more of the target spaces A, B and C, the leakage refrigerant can be diffused into all the target spaces A, B and C, thereby preventing an increase in the concentration of refrigerant only in the one or more target spaces.

It should be noted that in the case where refrigerant having a greater density than air under atmospheric pressure is used and the load unit 30 is provided above the target spaces A, B and C, when refrigerant leakage is detected, it is not indispensable to operate the fan 34. For example, in the case where refrigerant leaks in the load unit 30 while the fan 34 is in the stopped state, the leakage refrigerant can be made, by opening all the dampers 71, 72, 73, 81, 82 and 83, to flow downwards from the load unit 30 into all the target spaces A, B and C via the air supply passages or the return passages. Therefore, the leakage refrigerant can be diffused into all the target spaces A, B and C, thereby preventing an increase in the concentration of refrigerant only in the one or more target spaces. The same is true of the case where refrigerant having a density smaller than the air under atmospheric pressure is used and the load unit 30 is provided below the target spaces A, B and C.

In the case where flammable refrigerant is used as the refrigerant, the amount of refrigerant is set to satisfy $M < LFL \times \Sigma(Ak \times Hk)$ (k=a to c), where M [kg] is the amount of refrigerant, Aa×Ha [m$^3$] is the volume of the target space A, Ab×Hb [m$^3$] is the volume of the target space B, Ac×Hc [m$^3$] is the volume of the target space C, and LFL [kg/m$^3$] is a lower flammability limit that is the minimum concentration of the refrigerant for combustion. That is, the amount M [kg] of the refrigerant is set to satisfy the relationship "$M < LFL \times V$", where V [m$^3$] is the total volume of all the target spaces that are air-conditioned by the air-conditioning system. For example, as the heat source unit 20 and the load unit 30, a given type of heat source unit and a given type of load unit that satisfy the above relationship are selected. Furthermore, in accordance with the positional relationship between the heat source unit 20 and the load unit 30, lengths of the extension pipes 12a and 12b may be increased, thereby necessitating addition of further refrigerant. In this case, it is preferable that the amount M satisfy the above relationship after further refrigerant is added.

According to embodiment 1, the leakage refrigerant can be diffused into all the target spaces A, B and C, and it is therefore possible to prevent the concentration of the refrigerant in the target spaces A, B and C from exceeding the flammability limit, by setting the amount M to a value satisfying the above relationship.

Figure 3:
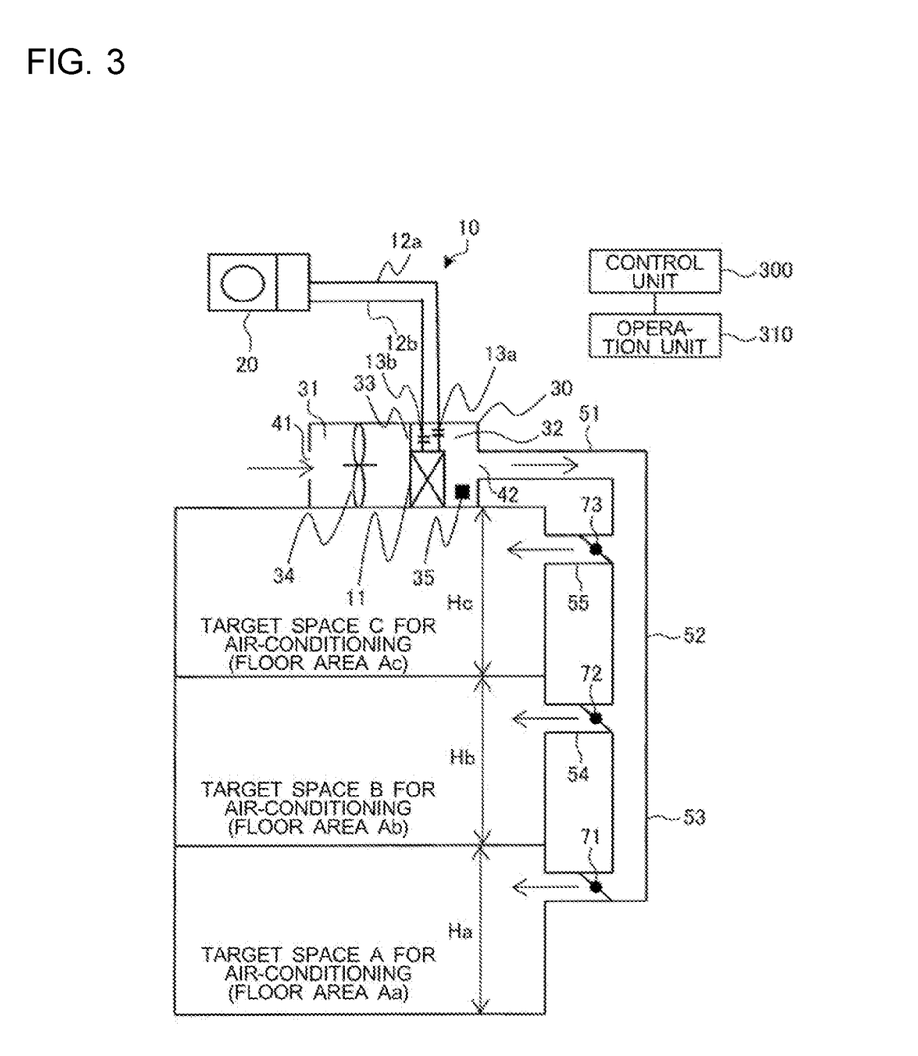
FIG. 3 illustrates a schematic configuration of an air-conditioning system according to a first modification of embodiment 1 of the present invention.

FIG. 3 illustrates a schematic configuration of an air-conditioning system according to a first modification of embodiment 1. As illustrated in FIG. 3, the air-conditioning system according to the first modification is an outdoor-air processing type air-conditioning system that processes an outside-air load. In the air-conditioning system of the first modification, none of dampers 81, 82 and 83 in the return passage is provided. In this regard, the air-conditioning system of the first modification is different from the air-conditioning system as illustrated in FIG. 1. Outside air is introduced into the air inlet 41 of the load unit 30. The other configuration is the same as or similar to that of the air-conditioning system as illustrated in FIG. 1. Also, in the first modification, it is possible to obtain the same advantages as in the air-conditioning system as illustrated in FIG. 1.

Figure 4:
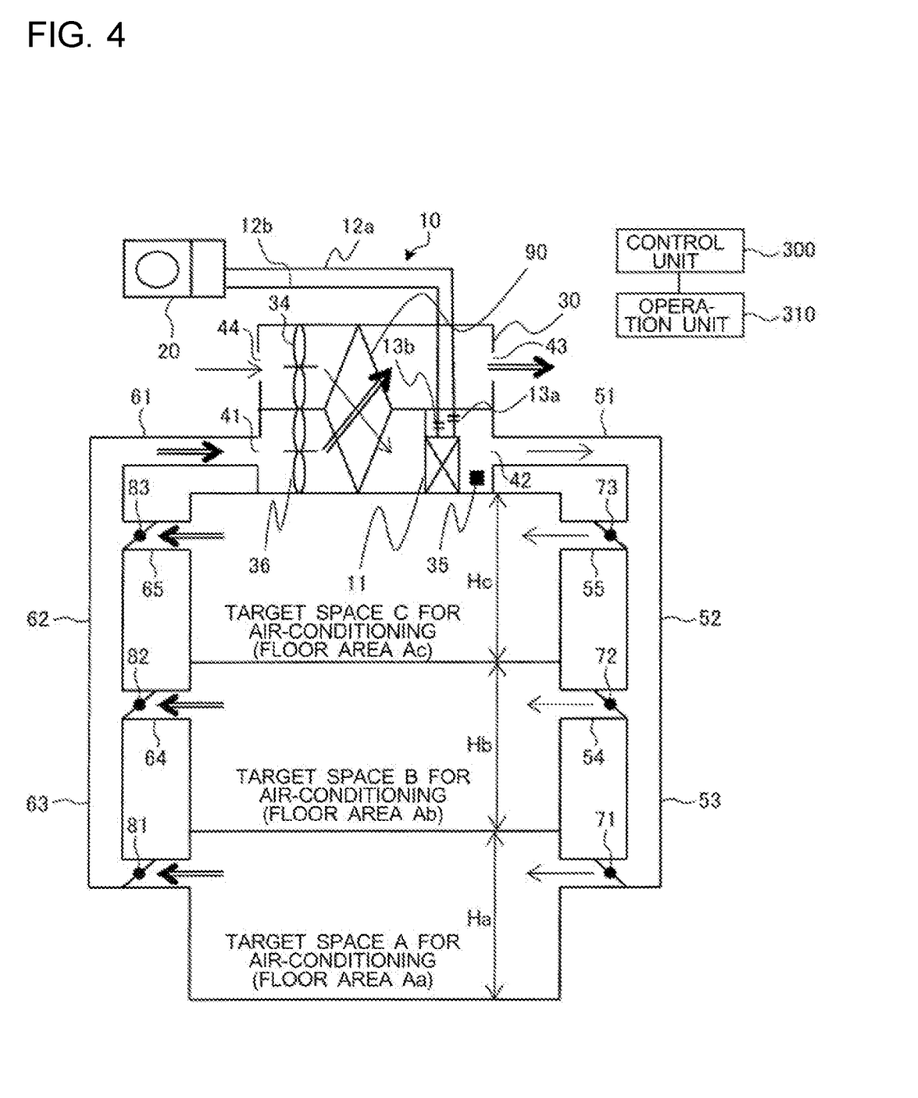
FIG. 4 illustrates a schematic configuration of an air-conditioning system according to a second modification of embodiment 1 of the present invention.

FIG. 4 illustrates a schematic configuration of an air-conditioning system according to a second modification of embodiment 1. As illustrated in FIG. 4, the air-conditioning system according to the second modification includes an air supply passage that introduces outside air from an outside air inlet 44 using the fan 34 and supplies the outside air into the target spaces A, B and C, and an exhaust passage that exhausts air from the target spaces A, B and C to the outside using a fan 36. The load unit 30 includes a total heat exchanger 90 that transfers sensible heat and latent heat between the outside air introduced into the air supply passage and return air passing through the exhaust passage. The return air that passes through the total heat exchanger 90 is completely exhausted to the outside through an exhaust port 43. By contrast, the outside air that passes through the total heat exchanger 90 is further subjected to heat exchange with the refrigerant in the load-side heat exchanger 11, and then supplied to the target spaces A, B and C. It should be noted that the load unit 30 may also be provided with a sensible heat exchanger instead of the total heat exchanger 90.

In the configuration of the second modification, when refrigerant leakage occurs, it suffices that of the dampers 71, 72, 73, 81, 82 and 83, only the dampers 71, 72 and 73 at the air supply passage at which the load-side heat exchanger 11 is provided are opened. Therefore, it suffices that the dampers 71, 72 and 73 can communicable with the control unit 300. It should be noted that the dampers 81, 82 and 83 at the exhaust passage may also be capable of communicating with the control unit 300. In the case where the dampers 81, 82 and 83 are opened when refrigerant leakage occurs, the leakage refrigerant in the load unit 30 is not only diffused into the target spaces A, B and C, but exhausted to the outside via the exhaust passage. It is therefore possible to further reduce the concentration of refrigerant in the target spaces A, B and C. Furthermore, the dampers 81, 82 and 83 may also be configured to open/close in interlock with the dampers 71, 72 and 73, respectively.

Figure 5:
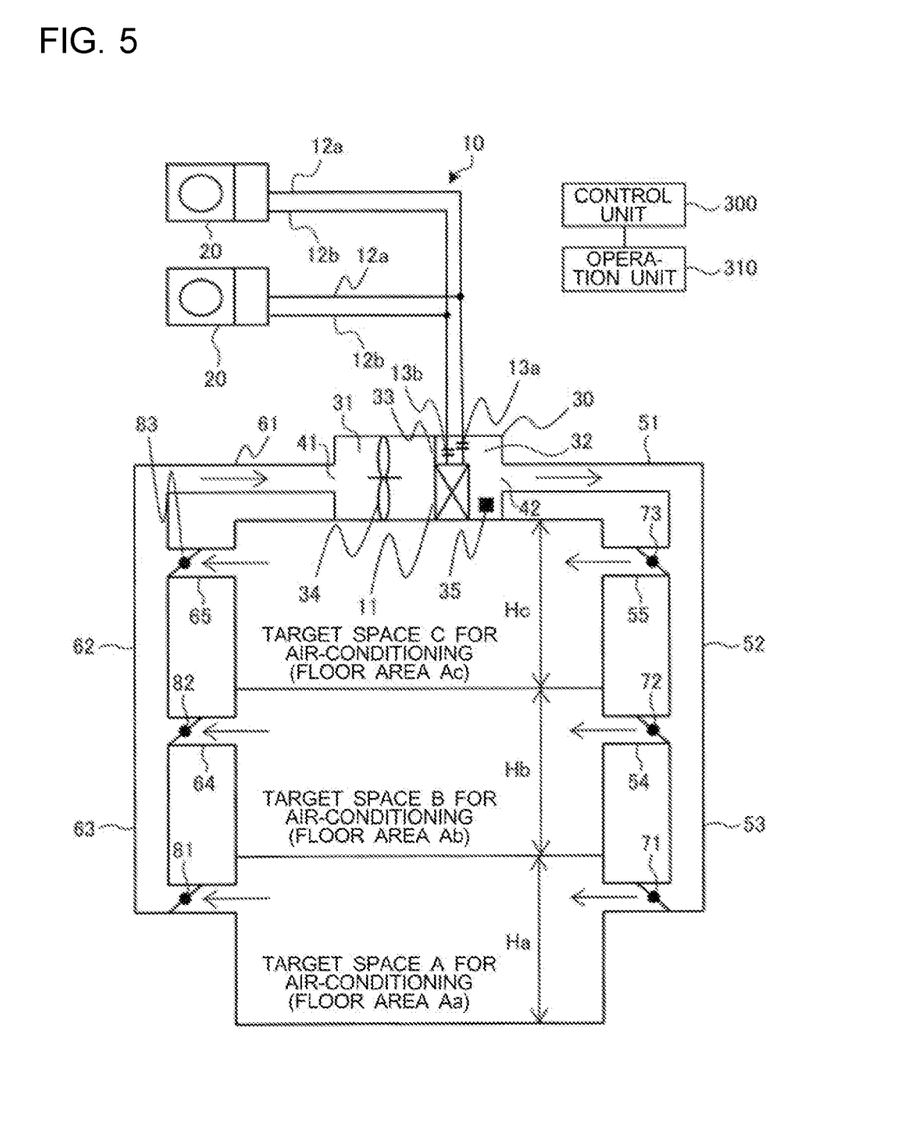
FIG. 5 illustrates a schematic configuration of an air-conditioning system according to a third modification of embodiment 1 of the present invention.

FIG. 5 illustrates a schematic configuration of an air-conditioning system according to a third modification of embodiment 1. As illustrated in FIG. 5, the air-conditioning system according to the third modification includes a plurality of heat source units 20 connected in parallel with a single refrigerant circuit 10 and a single load unit 30. Also, in the third modification, it is also possible to obtain the same advantages as in the air-conditioning system as illustrated in FIG. 1.

Figure 6:
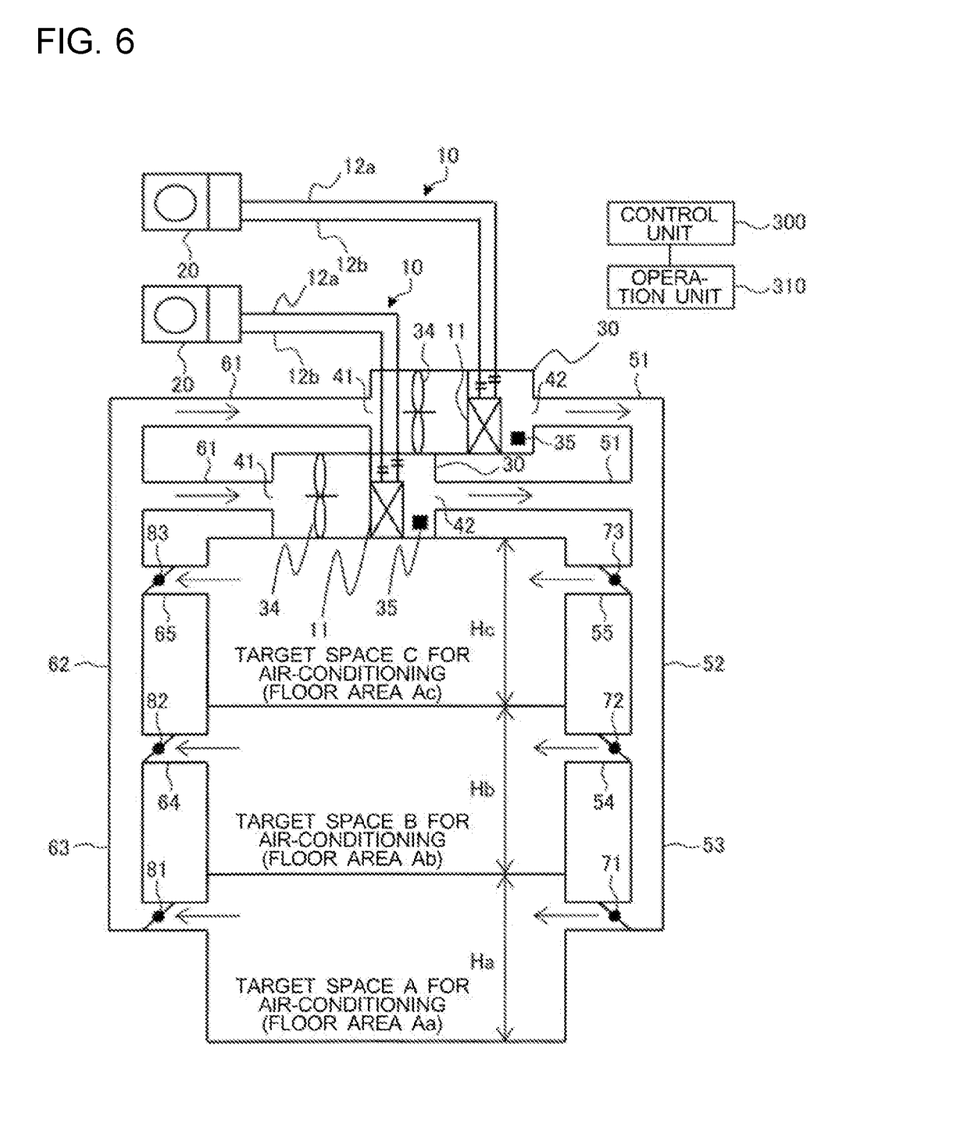
FIG. 6 illustrates a schematic configuration of an air-conditioning system according to a fourth modification of embodiment 1 of the present invention.

FIG. 6 illustrates a schematic configuration of an air-conditioning system according to a fourth modification of embodiment 1. As illustrated in FIG. 6, the air-conditioning system according to the fourth modification includes a plurality of sets of refrigerant circuits 10, load units 30 and heat source units 20. The air supply passages and the return passages are connected in parallel to the plurality of load units 30. In the third modification, it is possible to obtain the same advantages as in the air-conditioning system as illustrated in FIG. 1.

As described above, the air-conditioning system according to embodiment 1 includes the refrigerant circuit 10 that circulates refrigerant, the load unit 30 (an example of the heat exchange unit) that houses the load-side heat exchanger 11 of the refrigerant circuit 10 and is connected with the plurality of air-conditioned spaces A, B and C by a plurality of air supply passages for use in supply of air that passes through the load-side heat exchanger 11, the refrigerant detection device 35 that detects leakage of refrigerant, and the plurality of dampers 71, 72 and 73 (an example of the opening/closing device) that are each provided in an associated one of the plurality of air supply passages, are opened/closed independently of each other, and are all opened when the refrigerant detection device 35 detects leakage of refrigerant.

In the above configuration, it is possible to diffuse leakage refrigerant to all the target spaces A, B and C, and thus prevent an increase in the refrigerant concentration only in one or more of the target spaces.

Furthermore, the air-conditioning system according to embodiment 1 further includes fans 34, which are operated when the refrigerant detection device 35 detects leakage of refrigerant. In this configuration, it is possible to more reliably cause the leakage refrigerant to be diffused into the target spaces A, B and C.

The air-conditioning system according to embodiment 1 further includes the control unit 300 that controls the refrigerant circuit 10. The control unit 300 does not allow the refrigerant circuit 10 to be operated, unless the control unit 300 is connected to the refrigerant detection device 35 and the plurality of dampers 71, 72 and 73 such that the control unit 300 can communicate with the refrigerant detection device 35 and the dampers 71, 72 and 73. In this configuration also, it is possible to further improve the safety of the air-conditioning system.

In the air-conditioning system according to embodiment 1, the refrigerant may be flammable refrigerant.

In the air-conditioning system according to embodiment 1, the relationship "M<LFL×V" is satisfied, where M [kg] is the amount of the refrigerant in the refrigerant circuit 10, LFL [kg/m$^3$] is the lower flammability limit of the refrigerant that is the minimum concentration of the refrigerant for combustion, and V [m$^3$] is the total volume of one or more of the target spaces (for example, all the plurality of target spaces A, B and C) connected with the load unit 30 via one or more of the dampers (for example, all the plurality of dampers 71, 72 and 73) which are opened when the refrigerant detection device 35 detects leakage of the refrigerant. In this configuration, it is possible to prevent the refrigeration concentration of the target spaces A, B and C from exceeding the lower flammability limit.

The refrigerant-amount setting method for the air-conditioning system according to embodiment 1 is a method for setting the amount of refrigerant in the air-conditioning system. To be more specific, in the refrigerant-amount setting method, the amount of refrigerant enclosed in the refrigerant circuit 10 is set such that M<LFL×V is satisfied, where M [kg] is the amount of the refrigerant in the refrigerant circuit 10, LFL [kg/m$^3$] is the lower flammability limit of the refrigerant that is the minimum concentration of the refrigerant for combustion, and V [m$^3$] is the total volume of one or more of the target spaces (for example, all the plurality of target spaces A, B and C) connected with the load unit 30 via one or more of the dampers (for example, all the plurality of dampers 71, 72 and 73) that are opened when the refrigerant detection device 35 detects leakage of the refrigerant. In this configuration, it is possible to prevent generation of flammable concentration areas in the target spaces A, B and C. It is possible to prevent the refrigeration concentration of the target spaces A, B and C from exceeding the lower flammability limit.

Embodiment 2

An air-conditioning system and a refrigerant-amount setting method therefor according to embodiment 2 of the present invention will be described. The air-conditioning system according to embodiment 2 includes a setting device that is operated by a technician for installation to determine in advance one or more of dampers 71, 72 and 73 that are to be opened when refrigerant leakage occurs. As the setting device, for example, the operation unit 310 is used. As the damper or dampers that are to be opened when refrigerant leakage occurs, at least one damper is selected from among all the dampers 71, 72 and 73 provided at the air supply passage. Identification information on the damper or dampers determined to be opened when refrigerant leakage occurs is stored in a ROM (for example, flash memory) in the control unit 300.

The damper or dampers that are to be opened when refrigerant leakage occurs are determined in consideration of the volume of a target space or spaces that communicate with the load unit 30 via the damper or dampers. In the case where flammable refrigerant is used as the refrigerant, the amount of enclosed refrigerant satisfies M<LFL×V, where M [m$^3$] is the amount of the enclosed refrigerant, V [m$^3$] is the total volume of the target space or spaces that communicate with the load unit 30 via one or more of the dampers 71, 72 and 73 that are opened when refrigerant leakage occurs, and LFL [kg/m$^3$] is the lower flammability limit that is the minimum concentration of the refrigerant for combustion. In other words, of the dampers 71, 72 and 73, the damper or dampers that are to be opened when refrigerant leakage occurs are determined at the time of, for example, installing the air-conditioning system, in such a manner as to satisfy the above relationship.

Figure 7:
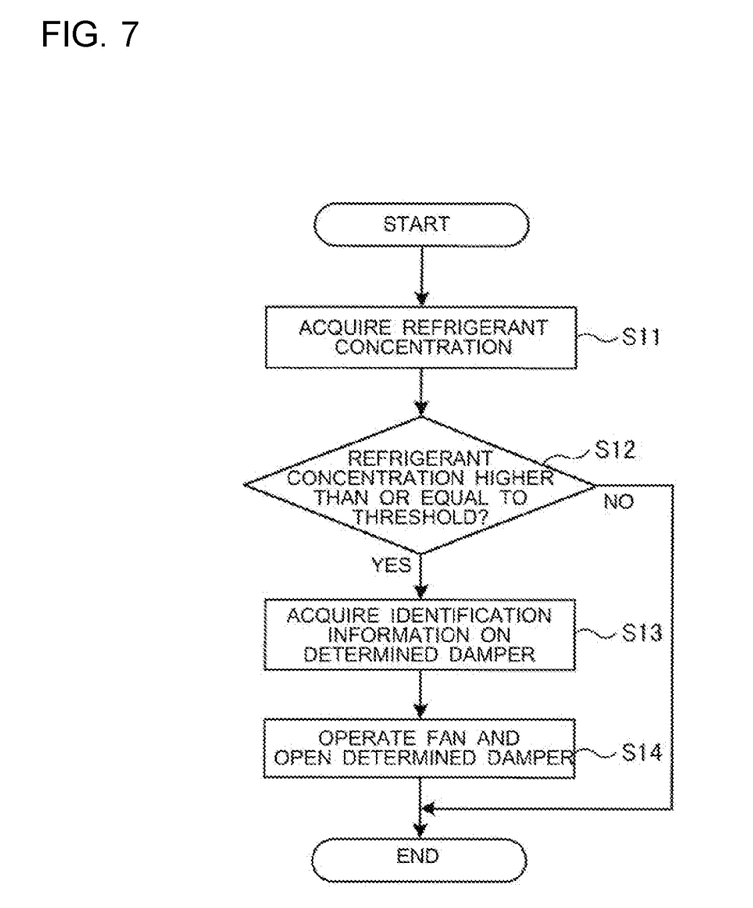
FIG. 7 is a flowchart illustrating an example of a refrigerant leakage detection process that is executed by a control unit 300 of an air-conditioning system according to embodiment 2 of the present invention.

FIG. 7 is a flowchart of an example of a refrigerant leakage detection process that is executed by the control unit 300 of the air-conditioning system according to embodiment 1. The refrigerant leakage detection process is repeatedly executed at predetermined time intervals only during the operation of the air-conditioning system or at all times regardless whether the air-conditioning system is in operation or in the stopped state, as long as power is supplied to the air-conditioning system. Steps S11 S12 are the same as steps S1 and S2 indicated in FIG. 2.

In step S12, when it is determined that the concentration of refrigerant is higher than or equal to the threshold, the process proceeds to step S13. In step S13, the control unit 300 acquires from the ROM the identification information on the damper or dampers determined to be opened when refrigerant leakage occurs.

In step S14, the control unit 300 causes the fan 34 to operate. That is, when the fan 34 is already operated, the control unit 300 keeps the fan 34 operated, and when the fan 34 is in the stopped state, the control unit 300 causes the fan 34 to start to operate. Furthermore, in step S14, the control unit 300 opens the damper or dampers determined to be opened when refrigerant leakage occurs. To be more specific, the control unit 300 opens a closed one or ones of the damper or dampers determined to be opened when refrigerant leakage occurs, and keeps an opened one or ones of the above damper or dampers opened. Thereby, of the dampers 71, 72 and 73, the damper or dampers determined to be opened when refrigerant leakage occurs are all opened. Also, one or more of the dampers 81, 82 and 83 or all the dampers 81, 82 and 83 are opened as occasion needs.

As described above, in this refrigerant leakage detection process, when refrigerant leakage is detected, the fan 34 is started to operate and a predetermined one or ones of the dampers 71, 72 and 73 are opened. Thereby, the leakage refrigerant in the load unit 30 together with air blown by the fan 34 is blown into at least one target space via the opened damper or dampers. Therefore, even if refrigerant leakage occurs while conditioned air is being supplied only to a target space having a small volume, the leakage refrigerant can be diffused into at least one target space having a necessary total volume, thereby preventing an increase in the concentration of refrigerant only in a target space having a small volume.

As described above, the air-conditioning system according to embodiment 2 includes the refrigerant circuit 10 that circulates refrigerant, the load unit 30 (an example of the heat exchange unit) that houses the load-side heat exchanger 11 of the refrigerant circuit 10 and is connected with the plurality of target spaces A, B and C by the plurality of air supply passages for use in the supply of air passing through the load-side heat exchanger 11, the refrigerant detection device 35 that detects leakage of the refrigerant, a plurality of dampers 71, 72 and 73 (an example of the opening/closing devices) that are each provided at an associated one of the plurality of air supply passages and opened/closed independently of each other, and the setting device (for example, the operation unit 310) that determines one or more of the plurality of dampers 71, 72 and 73 that are to be opened when the refrigerant detection device 35 detects leakage of the refrigerant. The damper or dampers determined by the setting device are opened when the refrigerant detection device 35 detects leakage of the refrigerant.

In this configuration, it is possible to cause leakage refrigerant to be diffused into at least one target space having a necessary total volume and thereby prevent an increase only in the concentration of refrigerant in a target space having a small volume.

In the air-conditioning system according to embodiment 2, the amount of the refrigerant enclosed in the refrigerant circuit 10 satisfies M<LFL×V, where M [kg] is the amount of the refrigerant enclosed in the refrigerant circuit 10, LFL [kg/m$^3$] is the lower flammability limit that is the minimum concentration of the refrigerant for combustion, and V [m$^3$] is the total volume of a target space or target spaces connected with the load unit 30 via the damper or dampers (for example, damper or dampers determined by the setting device) that are opened when the refrigerant detection device 35 detects refrigerant leakage. In this configuration, it is possible to prevent the refrigeration concentration of the target space or target spaces from exceeding the lower flammability limit.

The refrigerant-amount setting method for the air-conditioning system according to embodiment 2 is a method for setting the amount of refrigerant in the air-conditioning system. In the refrigerant-amount setting method, the amount of refrigerant enclosed in the refrigerant circuit 10 is set such that M<LFL×V is satisfied, M [kg] is the amount of the refrigerant enclosed in the refrigerant circuit 10, LFL [kg/m$^3$] is the lower flammability limit that is the minimum concentration of the refrigerant for combustion, and V [m$^3$] is the total volume of the target space or spaces connected with the load unit 30 via the damper or dampers (for example, dampers determined by the setting device) that are opened when the refrigerant detection device 35 detects refrigerant leakage. In this configuration, it is possible to prevent the refrigeration concentration in the target space or target spaces from exceeding the lower flammability limit.

The present invention is not limited to the above embodiments, but can be variously modified.

For example, although with respect to each of the above embodiments, an air-conditioning system intended for air-conditioning for people is described above by way of example, the air-conditioning system of the present invention also covers air-conditioning systems intended for air-conditioning for objects, such as refrigeration warehouses or cold storages.

The above embodiments and modifications can be put to practical use in combination.

REFERENCE SIGNS LIST 10 refrigerant circuit 11 load-side heat exchanger 12a, 12b extension pipe 13a, 13b joint portion 20 heat source unit 30 load unit 31 fan chamber 32 heat exchanger chamber 33 partition plate 34 fan 35 refrigerant detection device 36 fan 41 air inlet 42 air outlet 43 exhaust port 44 outside air inlet 51, 52, 53, 54, 55 air supply duct 61, 62, 63, 64, 65 return duct 71, 72, 73, 81, 82, 83 damper 90 total heat exchanger 300 control unit 310 operation unit

The invention claimed is:

1. An air-conditioning system comprising:
a refrigerant circuit configured to circulate refrigerant;
a load-side unit configured to house a load-side heat exchanger provided in the refrigerant circuit, the load-side unit being connected with a plurality of target spaces for air-conditioning by a plurality of air supply passages for use in supply of air that passes through the load-side heat exchanger;
a refrigerant sensor configured to detect leakage of the refrigerant; and
a plurality of opening/closing dampers each provided in an associated one of the plurality of air supply passages, the plurality of opening/closing dampers being configured to operate to be opened/closed independently of each other,
the plurality of opening/closing dampers being configured to all open when the refrigerant sensor detects leakage of the refrigerant, wherein
an amount of refrigerant enclosed in the refrigerant circuit satisfies M<LFL×V, where M [kg] is the amount of the refrigerant enclosed in the refrigerant circuit, LFL [kg/m$^3$] is a lower flammable limit that is a minimum concentration of the refrigerant for combustion, and V [m$^3$] is a total volume of one or more of the target spaces that are connected with the load-side unit via the one or more of the plurality of opening/closing dampers that are opened when the refrigerant sensor detects leakage of the refrigerant.

2. The air-conditioning system of claim 1, further comprising a fan configured to operate when the refrigerant sensor detects leakage of the refrigerant.

3. The air-conditioning system of claim 1, further comprising a controller configured to control the refrigerant circuit,
wherein the controller is configured not to allow the refrigerant circuit to operate unless the controller is connected to the refrigerant sensor and the plurality of opening/closing dampers such that the controller is allowed to communicate with the refrigerant sensor and the plurality of opening/closing devices.

4. The air-conditioning system of claim 1, wherein the refrigerant is flammable refrigerant.

5. An air-conditioning system comprising:
a refrigerant circuit configured to circulate refrigerant;
a load-side unit configured to house a load-side heat exchanger provided in the refrigerant circuit, the load-side unit being connected with a plurality of air-conditioned spaces by a plurality of air supply passages for use in supply of air which passes through the load-side heat exchanger;

a refrigerant sensor configured to detect leakage of the refrigerant;

a plurality of opening/closing dampers each provided in an associated one of the plurality of air supply passages, the plurality of opening/closing device being configured to operate to be opened/closed independently of each other; and a controller configured to determine one or more of the plurality of opening/closing dampers that are to be opened when the refrigerant sensor detects leakage of the refrigerant, the one or more of the plurality of opening/closing dampers that are determined by the controller are configured to open when the refrigerant sensor detects leakage of the refrigerant, wherein an amount of refrigerant enclosed in the refrigerant circuit satisfies M<LFL×V, where M [kg] is the amount of the refrigerant enclosed in the refrigerant circuit, LFL [kg/m$^3$] is a lower flammable limit that is a minimum concentration of the refrigerant for combustion, and V [m$^3$] is a total volume of one or more of the target spaces that are connected with the load-side unit via the one or more of the plurality of opening/closing dampers that are opened when the refrigerant sensor detects leakage of the refrigerant.

6. The air-conditioning system of claim 5, further comprising a fan configured to operate when the refrigerant sensor detects leakage of the refrigerant.

7. The air-conditioning system of claim 5, further comprising a controller configured to control the refrigerant circuit, wherein the controller is configured not to allow the refrigerant circuit to operate unless the controller is connected to the refrigerant sensor and the plurality of opening/closing dampers such that the controller is allowed to communicate with the refrigerant sensor and the plurality of opening/closing devices.

8. The air-conditioning system of claim 5, wherein the refrigerant is flammable refrigerant.

9. A method for controlling an air-conditioning refrigerant leak, comprising:

providing an air-conditioning system that comprises:
a refrigerant circuit configured to circulate refrigerant;
a load-side unit configured to house a load-side heat exchanger provided in the refrigerant circuit, wherein the load-side unit is connected with a plurality of target spaces for air-conditioning by a plurality of air supply passages for use in supply of air that passes through the load-side heat exchanger;
a refrigerant sensor configured to detect leakage of the refrigerant; and
a plurality of opening/closing dampers each provided in an associated one of the plurality of air supply passages, wherein the plurality of opening/closing dampers are configured to operate to be opened/closed independently of each other, wherein the plurality of opening/closing dampers are configured to all open when the refrigerant sensor detects leakage of the refrigerant;

determining an amount of refrigerant in the air-conditioning system, an amount of refrigerant enclosed in the refrigerant circuit is determined such that M<LFL×V is satisfied, where M [kg] is the amount of the refrigerant enclosed in the refrigerant circuit, LFL [kg/m$^3$] is a lower flammable limit that is a minimum concentration for combustion, and V [m$^3$] is a total volume of one or more of the target spaces that are connected with the load-side unit via the one or more of the plurality of opening/closing dampers that are opened when the refrigerant sensor detects leakage of the refrigerant; and adding the determined amount of refrigerant to the air-conditioning system such that M<LFL×V is satisfied.

10. The method of claim 9, further comprising
determining whether a controller cannot communicate with the refrigerant sensor and the plurality of opening/closing devices;
controlling the refrigerant circuit to not operate in response to determining that the controller cannot communicate with the refrigerant sensor and the plurality of opening/closing devices.

11. The method of claim 9, further comprising
detecting a refrigerant leak;
controlling the plurality of opening/closing dampers to all open in response to detecting the refrigerant leak.

12. A method for controlling an air-conditioning refrigerant leak, comprising:

providing an air-conditioning system that comprises:
a refrigerant circuit configured to circulate refrigerant;
a load-side unit configured to house a load-side heat exchanger provided in the refrigerant circuit, the load-side unit being connected with a plurality of air-conditioned spaces by a plurality of air supply passages for use in supply of air which passes through the load-side heat exchanger;
a refrigerant sensor configured to detect leakage of the refrigerant;
a plurality of opening/closing dampers each provided in an associated one of the plurality of air supply passages, the plurality of opening/closing device being configured to operate to be opened/closed independently of each other; and
a controller configured to determine one or more of the plurality of opening/closing dampers that are to be opened when the refrigerant sensor detects leakage of the refrigerant, wherein the one or more of the plurality of opening/closing dampers that are determined by the controller are opened when the refrigerant sensor detects leakage of the refrigerant determining an amount of refrigerant in the air-conditioning system, an amount of refrigerant enclosed in the refrigerant circuit is determined such that M<LFL×V is satisfied, where M [kg] is the amount of the refrigerant enclosed in the refrigerant circuit, LFL [kg/m$^3$] is a lower flammable limit that is a minimum concentration for combustion, and V [m$^3$] is a total volume of one or more of the target spaces that are connected with the load-side unit via the one or more of the plurality of opening/closing dampers that are opened when the refrigerant sensor detects leakage of the refrigerant; and adding the determined amount of refrigerant in the air-conditioning system such that M<LFL×V is satisfied.

13. The method of claim 12, further comprising
detecting a refrigerant leak;
setting one or more of the plurality of opening/closing dampers to be opened in response to a refrigerant leak;
controlling the plurality of opening/closing dampers that are set to open in response to detecting the refrigerant leak to open.

14. The method of claim 12, further comprising
determining whether a controller cannot communicate with the refrigerant sensor and the plurality of opening/closing devices;

controlling the refrigerant circuit to not operate in response to determining that the controller cannot communicate with the refrigerant sensor and the plurality of opening/closing devices.

\* \* \* \* \*